(12) United States Patent
Upadhyaya

(10) Patent No.: US 8,993,172 B2
(45) Date of Patent: Mar. 31, 2015

(54) LI-ION BATTERY AND BATTERY ACTIVE COMPONENTS ON METAL WIRE

(71) Applicant: Deepak Upadhyaya, Fremont, CA (US)

(72) Inventor: Deepak Upadhyaya, Fremont, CA (US)

(73) Assignee: Kalptree Energy, Inc., Livermore, CA (US)

( * ) Notice: Subject to any disclaimer, the term of this patent is extended or adjusted under 35 U.S.C. 154(b) by 189 days.

(21) Appl. No.: 13/708,137

(22) Filed: Dec. 7, 2012

(65) Prior Publication Data

US 2013/0344363 A1 Dec. 26, 2013

Related U.S. Application Data

(60) Provisional application No. 61/569,228, filed on Dec. 10, 2011, provisional application No. 61/587,632, filed on Jan. 17, 2012, provisional application No. 61/587,659, filed on Jan. 18, 2012.

(51) Int. Cl.
*H01M 4/70* (2006.01)
*H01M 4/76* (2006.01)
(Continued)

(52) U.S. Cl.
CPC ............ *H01M 4/0404* (2013.01); *H01M 2/105* (2013.01); *H01M 4/0471* (2013.01); *H01M 4/133* (2013.01); *H01M 4/134* (2013.01); *H01M 4/1393* (2013.01); *H01M 4/1395* (2013.01); *H01M 4/366* (2013.01); *H01M 4/386* (2013.01); *H01M 4/587* (2013.01); *H01M 4/661* (2013.01); *H01M 4/75* (2013.01); *H01M 10/04* (2013.01); *H01M 10/049* (2013.01); *H01M 10/0525* (2013.01); *H01M 10/058* (2013.01); *H01M 10/0587* (2013.01);
*H01M 2004/021* (2013.01); *H01M 2004/022* (2013.01); *Y02E 60/122* (2013.01)
USPC ............ 429/238; 429/164; 429/209; 429/233

(58) Field of Classification Search
None
See application file for complete search history.

(56) References Cited

U.S. PATENT DOCUMENTS 2,734,478 A 2/1956 Reynolds et al.
3,313,269 A 4/1967 Hough
(Continued)

FOREIGN PATENT DOCUMENTS

| GB | WO 9505499 A1 | 2/1995 |
| KR | 10-2004-0025127 | 4/2004 |
| KR | 10-2005-0099903 | 10/2005 |

OTHER PUBLICATIONS

Paper: E.F. Vaage, "Transmission Properties of Laminated Clogston Type Conductors", Bell Systems Technical Journal, May 1953, 20 pages.

(Continued)

*Primary Examiner* — Cynthia K. Walls
(74) *Attorney, Agent, or Firm* — Thomas Schneck

(57) ABSTRACT

A battery on a conductive metal wire and components of a battery on a conductive metal wire of circular cross section diameter of 5-500 micrometers and methods of making the battery and battery components are disclosed. In one embodiment, the battery features a porous anode or cathode layer which assist with ion exchange in batteries. Methods of forming the porous anode or cathode layer include deposition of an inert gas or hydrogen enriched carbon or silicon layer on a heated metal wire followed by annealing of the inert gas or hydrogen enriched carbon silicon layer. Energy storage devices having bundles of batteries on wires are also disclosed as are other energy storage devices.

5 Claims, 14 Drawing Sheets

(51) Int. Cl.

| | | |
|---|---|---|
| *H01M 6/08* | (2006.01) |
| *H01M 2/10* | (2006.01) |
| *H01M 4/04* | (2006.01) |
| *H01M 4/133* | (2010.01) |
| *H01M 4/134* | (2010.01) |
| *H01M 4/1393* | (2010.01) |
| *H01M 4/1395* | (2010.01) |
| *H01M 4/36* | (2006.01) |
| *H01M 4/38* | (2006.01) |
| *H01M 4/587* | (2010.01) |
| *H01M 4/66* | (2006.01) |
| *H01M 4/75* | (2006.01) |
| *H01M 10/04* | (2006.01) |
| *H01M 10/0525* | (2010.01) |
| *H01M 10/058* | (2010.01) |
| *H01M 10/0587* | (2010.01) |
| *H01M 4/02* | (2006.01) |

(56) References Cited

U.S. PATENT DOCUMENTS

| | | | |
|---|---|---|---|
| 3,542,604 A | 11/1970 | Arrance et al. | |
| 3,562,002 A | 2/1971 | Smith | |
| 3,622,369 A | 11/1971 | Basche | |
| 4,410,608 A | 10/1983 | Goebel et al. | |
| 4,522,897 A | 6/1985 | Walsh | |
| 4,675,259 A | 6/1987 | Totty | |
| 5,510,212 A | 4/1996 | Delnick et al. | |
| 5,571,561 A | 11/1996 | LePetitcorps et al. | |
| 5,909,104 A | 6/1999 | Scott | |
| 6,746,802 B2 | 6/2004 | Tamura et al. | |
| 7,202,000 B2 | 4/2007 | Iriyama et al. | |
| 7,351,449 B2 | 4/2008 | Hunt et al. | |
| 7,717,968 B2 | 5/2010 | Kalynushkin et al. | |
| 2005/0084759 A1 | 4/2005 | Miyachi et al. | |
| 2007/0243456 A1 | 10/2007 | Ahn et al. | |
| 2008/0137890 A1* | 6/2008 | Petersen et al. | 381/323 |
| 2008/0268343 A1 | 10/2008 | Sato et al. | |
| 2010/0047574 A1 | 2/2010 | Durman et al. | |
| 2010/0203372 A1* | 8/2010 | Kim et al. | 429/94 |
| 2010/0261071 A1 | 10/2010 | Lopatin et al. | |
| 2012/0009331 A1 | 1/2012 | Kwon et al. | |
| 2012/0015233 A1 | 1/2012 | Kwon et al. | |
| 2012/0015239 A1 | 1/2012 | Kwon et al. | |
| 2012/0058376 A1 | 3/2012 | Kwon et al. | |
| 2012/0100408 A1 | 4/2012 | Kwon et al. | |
| 2012/0100415 A1 | 4/2012 | Kwon et al. | |
| 2012/0100440 A1 | 4/2012 | Narula et al. | |
| 2012/0148902 A1* | 6/2012 | Kwon et al. | 429/149 |
| 2012/0156554 A1 | 6/2012 | Kwon et al. | |

OTHER PUBLICATIONS

English translation: U.S. Appl. No. 11/578,045, corresponding to Korean appln. 10-2004-0025127, 18 pages.

* cited by examiner

LI-ION BATTERY AND BATTERY ACTIVE COMPONENTS ON METAL WIRE

CROSS-REFERENCE TO RELATED APPLICATIONS

This application claims the benefit of priority from U.S. Provisional Application No. 61/569,228 filed on Dec. 10, 2011, U.S. Provisional Application No. 61/587,632 filed on Jan. 17, 2012, and U.S. Provisional Application No. 61/587,659 filed on Jan. 18, 2012, all of which are hereby incorporated by reference.

FIELD OF THE INVENTION

The invention pertains in general to batteries and, in particular, to rechargeable batteries and rechargeable battery components, principally electrodes, and methods for making fail-safe damage tolerant rechargeable batteries and rechargeable battery components.

BACKGROUND

The demand for efficiency improvements in energy storage systems is driving the development of batteries with higher energy density, increased depth of discharge, a longer cycle life and a lighter, flexible form factors. Most current research effort is directed towards Li-ion batteries (LIBs) because of their inherent higher energy density compared to other types of rechargeable battery chemistries, and negligible memory effect after numerous charge-discharge cycles. Thus, for the past twenty years, significant resources have been directed on improving electrochemical performance of the active electrode materials, developing safer electrodes and electrolytes, and lowering the manufacturing cost of LIBs. However, LIBs are designed to meet specific application requirements and a tradeoff is often made between various parameters such as high energy density vs. high power, charge-discharge rate vs. capacity and cycle life, safety vs. cost etc. These tradeoffs become necessary, primarily due to the limitations imposed by the electrochemical properties of the active materials, electrolyte, and separator as well as battery manufacturing methods.

Lithium ion batteries (LIBs) in various shape and size are widely used in various kinds of portable electronic devices, medical devices and are being considered for use in electric vehicle as well for use in solar power systems, smart electricity grids and electric tools. However, current state of the art (SOA) Li-ion battery technology is limited in terms of energy capacity, charging speed and manufacturing cost. Based on Department of Energy (DOE) reports, ten years of effort, and billions in spending on Li-ion battery development, the manufacturing cost of LIBs has not decreased significantly and is still three to six times higher than the DOE target ($700/kWh-current vs. $150/kWh-target). Also, performance of Li-ion battery has not improved as expected especially for scalable manufacturing platforms. A key contributor to the price stagnation and performance plateau is continued reliance on the same traditional battery manufacturing technology using roll-to-roll foil lamination that was developed over 20 years ago. Another contributing factor is the synthesis of the powder based active electrode material which constitutes 40-50% of the battery cost. Thus, a new battery design and manufacturing paradigm is required to address cost issues. Also, the state of art graphite anode based Li-ion battery technology is limited in terms of energy capacity, charging speed and safety. Because of limited anode capacity, batteries require charging more often. Competitive anode solutions have not overcome fundamental challenges resulting in limited calendar life as well as slow charging.

It has been reported that annealing of the cathode material on a substrate under proper conditions improves battery performance, as elevated temperature annealing causes the cathode material to crystallize. However, elevated temperature annealing increases the cost of cathode manufacturing. Thus, what is needed is to provide, for example, a low cost cathode manufacturing method having desired crystal structure for improved performance and safety.

Lithium-ion batteries are inherently not safe due to foil based structure where a large amount of energy is stored. Damage to the battery can lead to a short circuit releasing large amounts of energy and resulting in thermal runaway, fire, and explosion.

Thus, next generation Li-ion batteries require, for example, a cost effective continuous manufacturing method for battery and battery component as well as, for example, a higher capacity anode solution with fail-safe battery design.

DESCRIPTION OF RELATED ART

Cable type batteries are known in the art addressing need for flexible form factors. For example, Korean Patent Publication No. 10-2005-0099903 to Ahn et al. discloses a thread-type battery having an inner electrode formed on an inner current collector, an electrolyte formed on the inner electrode, an outer electrode formed on the inner electrode, and an outer current collector and protective coating part is formed on the outer electrode. U.S. Patent Publication No. 2012/0100408 to Kwon et al. also discloses a cable-type secondary battery including an electrode assembly which has a first polarity current collector having a long and thin wire shape with a circular cross-section, at least two first polarity electrode active material layers formed on the first polarity current collector, an electrolyte layer filled to surround the first polarity electrode active material layers, at least two second polarity active materials formed on the electrolyte layer, and a second polarity current collector configured to surround the outer surfaces of the second polarity electrode active material layers. U.S. Patent Publication No. 2012/0009331 to Kwan et al. discloses a method for manufacturing a cable-type secondary battery including use of an electrode slurry. Among the disadvantages of these batteries and battery components is that they fail to provide a small scale battery with an enlarged area for ion exchange.

SUMMARY OF THE INVENTION

Embodiments of the present invention include a battery component that uses a long circular cross-sectional metal wire as a substrate for an electrode in a solid state battery. Thin films on the wire can form a cathode, anode, and electrolyte. We define such a battery as energy wire and the embodiments result in battery structures that, for example, combine excellent performance characteristics of a solid state battery (excellent cycle and calendar life, high depth of discharge, rapid charging rate) with the high energy capacity of a traditional battery fabricated using powder based active materials. The metal wire substrate can perform as a current collector in an electrochemical cell. One embodiment of the invention includes, for example, a low cost method of manufacturing an amorphous three dimensional porous silicon-carbon composite anode active material. One embodiment describes a method where a porous anode structure is created. In an embodiment, an innovative low cost annealing technique to heat treat the deposited cathode material is provided to create desired crystalline as well as porosity of structure. Description of fabricating a high density battery is provided allowing formation of a damage tolerant battery. Further understanding of the nature and advantages of the embodiments of the present invention may be realized by reference to the latter portions of the specification and attached drawings.

In one embodiment, the invention comprises a battery having a conductive metal wire substrate for first and second porous layers formed on the metal wire, the metal wire, and first and second layers forming a first cylindrical electrode, a cylindrical second electrode spaced apart from the first electrode and an electrolyte disposed between the first and second electrode. The porous layers provide an enlarged area for ion exchange between the first and second electrodes.

In one embodiment, the invention comprises methods of making porous electrode assemblies.

In another embodiment, the invention comprises an electrochemical apparatus for use in a battery comprising an electrochemical assembly having a conductive metal wire with a circular cross section and a porous electrode layer disposed on the metal wire. The electrochemical apparatus may form an anode or a cathode. It may be connected to one or more additional electrochemical apparatuses in parallel or series. One form of connection is, for example, weaving together of members of adjacent electrochemical apparatuses. The electrochemical apparatus may be used to form different types of batteries.

One embodiment of the invention comprises an energy storage device having an array of batteries, each battery having first and second cylindrical electrodes formed on a metal wire, with all first electrodes connected at a first output electrode and all second electrodes connected at a second electrode output.

BRIEF DESCRIPTION OF THE DRAWINGS

FIG. 4b is a partial cross sectional front view of metal wire substrate of FIG. 4a.

FIG. 4c is a partial cross sectional side view of the metal wire substrate of FIG. 4b.

FIG. 9b is a partial cross sectional view of the battery bundle of FIG. 9a.

DETAILED DESCRIPTION OF THE INVENTION

Figure 1:
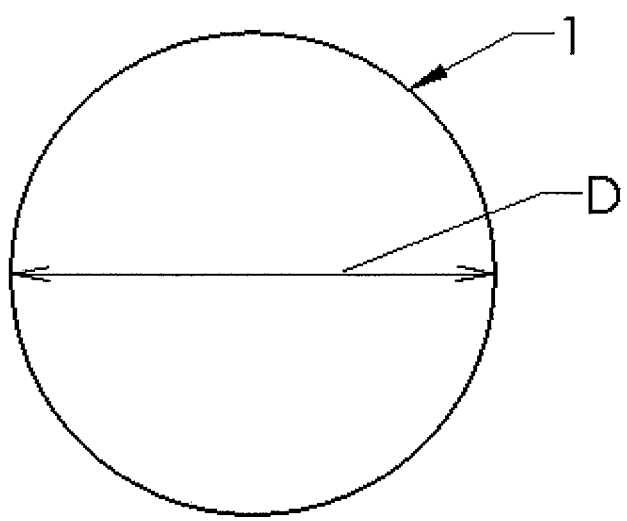
FIG. 1 is a side view of a metal wire substrate.

An embodiment of the present invention relates to the manufacturing of a solid state Li-ion battery on a conductive metal wire substrate, with diverse materials for the cathode, anode, electrolyte and current collector, all associated with the wire. FIG. 1 depicts a circular cross-sectional area of metal wire substrate 1. The metal wire 1 works as a current collector with a diameter D, having a range from 5 micron to 500 micron. Prior to deposition, metal wire can be clean as well as textured to a desired surface roughness using mechanical methods such as bead blasting or chemical methods such as a chemical etching method in order to enhance mechanical and chemical bonding between electrode coating and substrate. Having electrodes with circular cross-section, provides an increase in surface area compared to flat rectangular metal sheet or foil electrodes in traditional electrode fabrication. An increase in surface area coupled with an decrease in anode film thickness provides a fast charging capability for LIBs, as a reduction in weight and volume for equivalent energy density. This novel approach to fabricating solid state batteries on a metal wire enables the design of damage tolerant high density batteries.

Fabrication of Anode Material

Embodiments of this invention include a method of low cost manufacturing of a silicon-carbon layered composite anode material using thermal chemical vapor deposition (CVD) technology on a long, circular cross-sectional solid or hollow metal wire made of titanium, steel, or tungsten or tin plated cooper. The most promising means of improving the energy density of today's lithium-ion batteries is to replace the graphite based anode with higher energy density material such as silicon. However, the cycling performance of silicon is often problematic due to the large expansion and shrinkage during insertion and extraction of large amounts of lithium. Embodiments of this invention addresses several key issues necessary in obtaining superior Li insertion/extraction performance while maintaining structure integrity. Further, the capacity of a thin silicon film is not enough for practical purposes. An embodiment of the present invention addresses this by creating a multi-layer silicon and carbon structure where the carbon layer serves as both an intercalation compound as well as a mechanically compliant layer for management of lithiation induced internal stresses in addition to creating a reaction barrier between the silicon layer and the electrolyte, a porous and/or nano-crystalline microstructure, excellent substrate-film adhesion, and controlled stress state within the film structure. The capacity of the silicon-carbon layered composite anode can be tailored by changing thicknesses of individual silicon and carbon layer. The invention of fabricating an "anode-on-wire" structure addresses several key factors necessary in obtaining superior Li insertion/extraction performance. An appropriate analogy for the anode-on-wire structure is a cylindrical pressure vessel. Using this comparison, stresses in the anode-on-wire structure arising from electrochemical lithiation in thin film are analogous to stresses in a pressure vessel due to combined pressure loading. Silicon expansion and contraction can be likened to internal and external pressure loading, respectively, resulting in a primary tangential or hoop stress component. The continuous nature of the hoop stress around the circumference of the cylindrical structure is expected to eliminate the edge effects and stress concentrations common in planar anode structures i.e., lower compressive stress level in the film stack for the circular cross-section geometry as compared to the planar geometry. The use of a circular cross-section wire for anode fabrication provides several key benefits as compared to a traditional flat plate anode structure including accommodating volume expansion related stresses.

Application of thermal CVD to deposit structural ceramic film on various substrate forms is a well known process. However, the prior art method does not serve the needs of this invention in which, for example, a multi-layer thin film porous structure is formed as an electrochemical active material. In an embodiment of this invention a multistage reactor 20 (FIG. 2) is designed to create such an electrochemical active material as described below.

Figure 2:
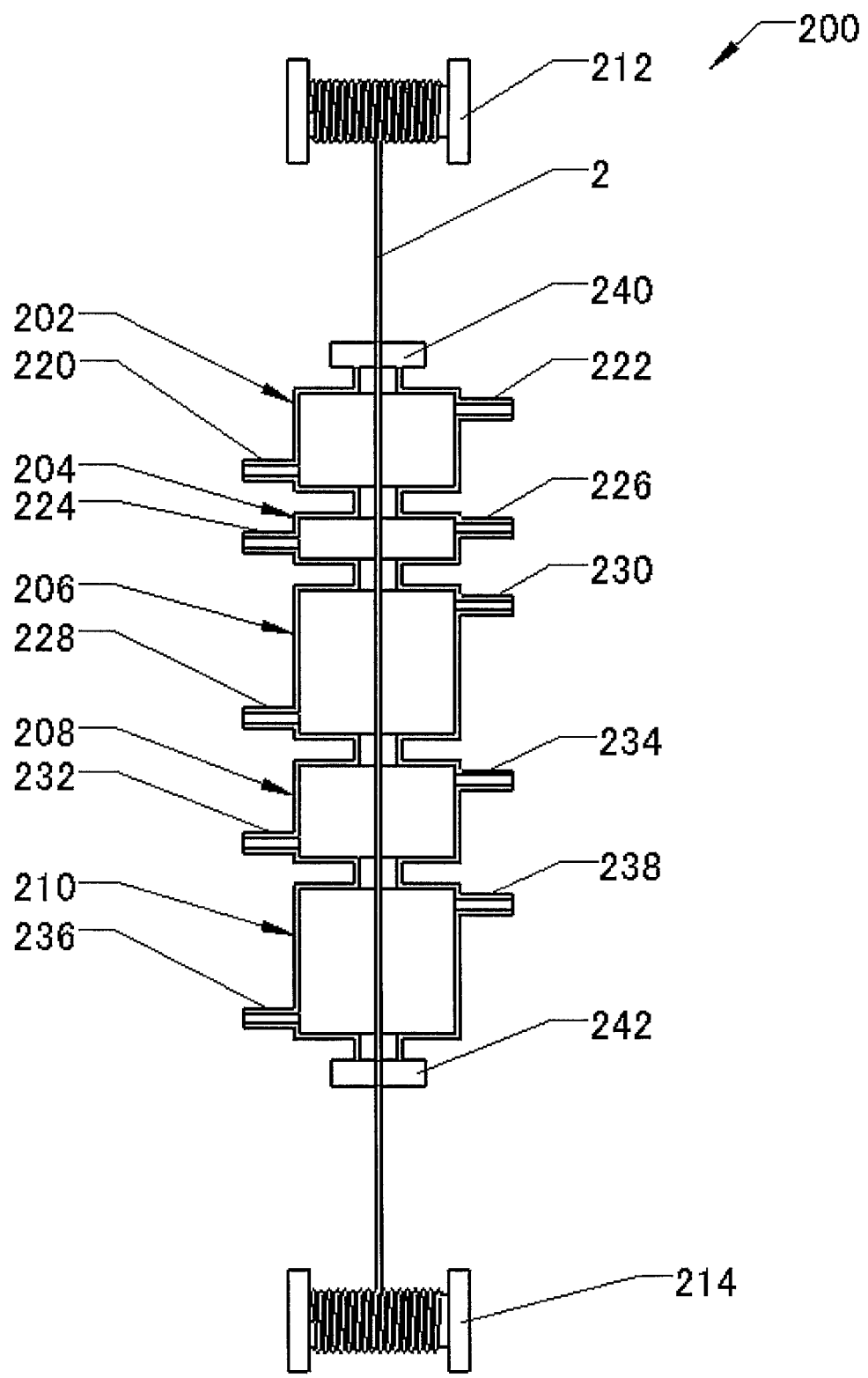
FIG. 2 is a front view of a system for processing a metal wire substrate.

In one embodiment of the invention, the wire 1 (FIG. 1) is resistively heated while carbon and/or silicon containing precursors are introduced at various locations to deposit anode material on the circumference of the metal wire 1. Traditional CVD precursors for silicon (such as dichlorosilane) and for carbon (such as methane) are introduced along the length of the reactor 200 (FIG. 2). Decomposition of the precursor compound is achieved by a thermal breakdown mechanism when precursor contacts the heated wire surface. External plasma sources such as RF or Microwave can also be used to further assist the decomposition rate of active precursor material. Amorphous and/or nano-crystalline silicon-carbon layered composite anode material is deposited on moving wire with thicknesses ranging from 2 to 20 μm depending upon the deposition parameters. The speed of the moving wire can be varied to increase or decrease the thickness of deposited anode material. Deposition temperature can be varied by resistively heating the metal wire with different current densities while it is moving through the deposition chamber. The deposition temperature of the moving wire in different chambers of the reactor 20 can be adjusted by introducing appropriate amount of cooling gas such hydrogen or helium. Variation in thickness of the individual coating layers can also be achieved by varying the ratio of chemistry to dilution gas, such as hydrogen or argon, within the process chamber. Following is an example method of a typical process sequence envisioned for fabricating "anode-on-wire" structures:

1. Resistively heating of wire and hydrogen etching of native oxide in chamber 202.

2. Deposition of a silicon adhesion layer (~20 to 50 nm thick) in chamber 204.

3 Deposition of the first carbon coating as a stress compliant layer in chamber 206.

4. Deposition of the silicon layer in chamber 208.

5. Deposition of a second carbon coating as a stress compliant layer in chamber 210.

The described manufacturing method is applicable for other suitable anode material for a Li-ion battery.

FIG. 2 depicts a metal wire 2 continuously moving through the deposition chambers, for example chambers 202, 204, 206, 208 and 210, in a chemical vapor deposition reactor 200. Tensioners may be used to control tension of the wire and the wire feed collected on reels 214 and 218. In one embodiment amorphous or nano-crystalline carbon-silicon-carbon thick film composite anode is deposited using high vapor pressure precursors for carbon and silicon. In order to deposit anode material on the circumference of the metal wire, wire is resistively heated while carbon and/or silicon containing gases are introduced at various locations. For carbon constituent of the anode, CVD gasses such as Methane or Acetylene or hexane or any carbon atom containing precursor gas with vapor pressure greater than 0.5 torr can be used. Carbon containing liquid precursor such as dimethyl adamantane can also be used in conjunction with a liquid evaporator and mass flow controller. For silicon constituent of the anode, CVD gasses such as mono silane or any variant of silicon containing gas (or high vapor pressure liquid) is used. Gases containing both carbon and silicon constituent such as methyl silane can also be used to form carbon-silicon thick film composite anode. Deposition temperature ranges from 200 to 2000 degree Celcius and are achieved by resistively heating the metal wire while it is moving through the deposition chamber. Exhaust gasses are pumped through ports or outlets 222, 226, 230, 234 and 238.

Referring to FIG. 2, anode material is deposited on the circumference of the metal wire 2 as the wire is resistively heated. Brush based electrical connection points 240 and 242 provide current for resistive heating. $H_2$ gas is introduced into chamber 202 through inlet 220 for hydrogen etching of wire 2. Exhaust gas is pumped out outlet 222. Silicon precursor is introduced into chamber 204 through inlet 224 for deposition of a silicon adhesion layer on the wire 2. Exhaust gas is pumped out outlet 226. Carbon precursor is introduced into chamber 206 through inlet 228 for deposition of a first carbon coating as a stress compliant layer on the silicon adhesion layer. Exhaust gas is pumped out outlet 230. Silicon precursor is introduced into chamber 208 through inlet 232 for deposition of a silicon layer on the carbon layer. Exhaust gas is pumped out outlet 234. Carbon precursor is introduced into chamber 210 through inlet 236 for deposition of a carbon layer on the silicon layer. Exhaust gases are pumped out of outlet 238.

Figure 3A:
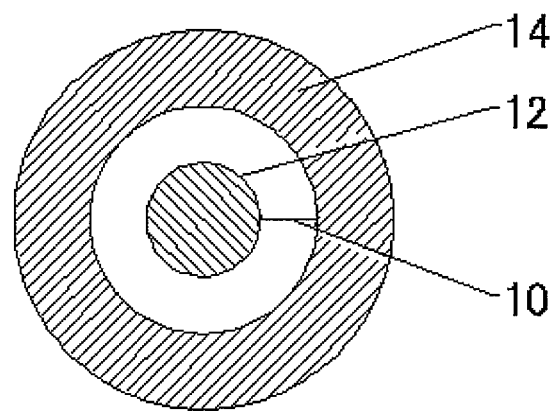
FIG. 3a is a cross sectional side view of an embodiment of an anode component.
Figure 3B:
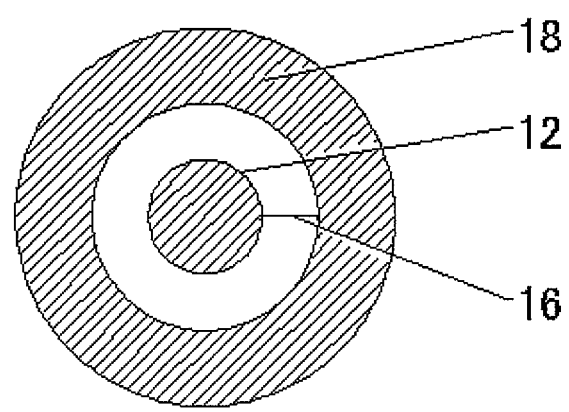
FIG. 3b is a cross sectional side view of another embodiment of an anode component.
Figure 3C:
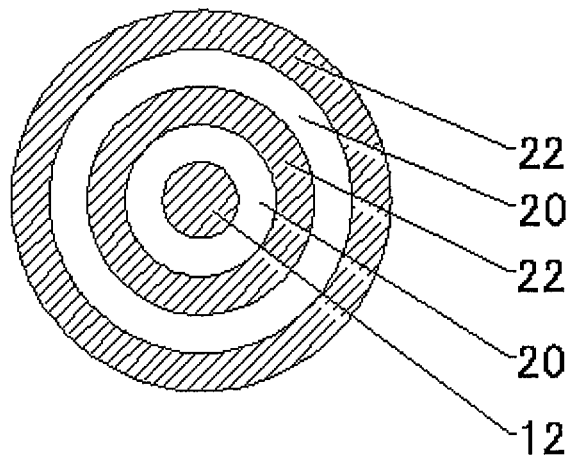
FIG. 3c is a cross-sectional side view of another embodiment of an anode component.

In another embodiment, as depicted in FIG. 3a, a carbon layer 10, thicker than 10 nm but thinner than 5 microns, is deposited on metal wire current collector 12 followed by deposition of silicon layer 14 of various thicknesses ranging from 1 micron to 100 microns. In another embodiment as depicted in FIG. 3b, a thin silicon layer 16, thicker than 10 nm but thinner than 5 microns, is deposited followed by a carbon layer 18 with thicknesses ranging from 1 micron to 100 microns. As depicted in FIG. 3c, alternate layers of carbon 20 and silicon 22 are deposited with thickness ranging from 10 nm to 100 microns. Based on these embodiments, various other configurations of silicon and carbon layers are possible such as the deposition of a single layer of silicon or a single layer of carbon on a metal wire as described above.

Figure 4A:
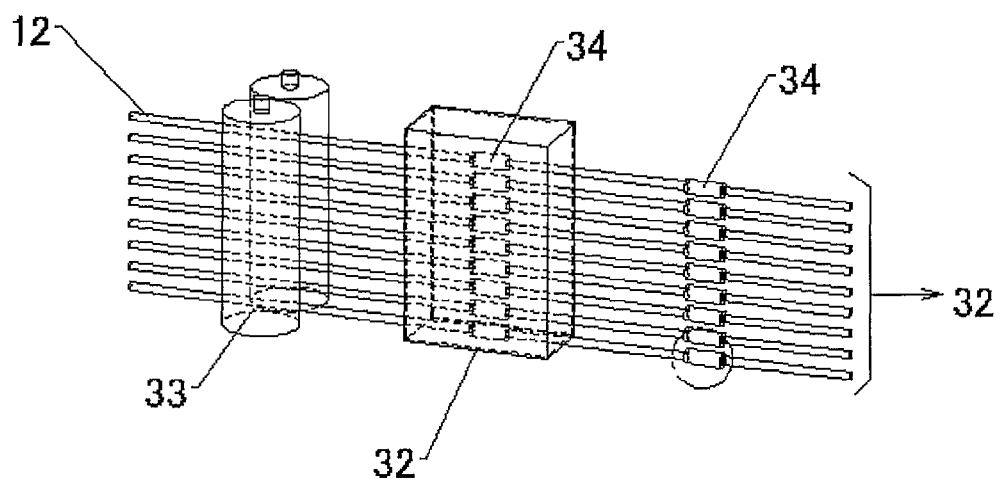
FIG. 4a is a perspective view of plurality of metal wire substrates having covers passing through a deposition chamber.
Figures 4B, 4C:
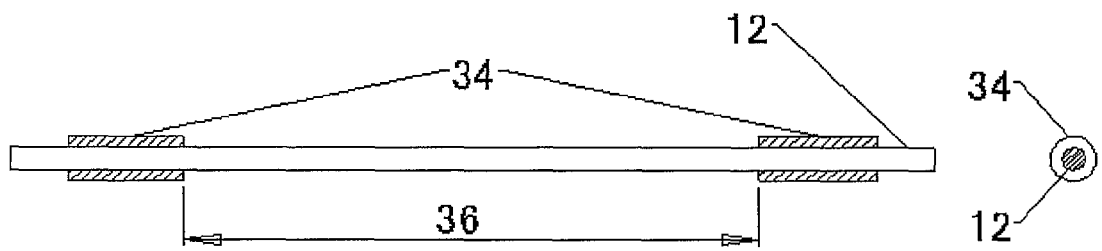

FIG. 4a illustrates a metal wire 12 moving through the deposition chamber 32 guided into the chamber by guide rollers 33. Before the metal wire substrate enters the deposition chamber 32, a cover 34 is placed over the metal wire at desired locations along the length of the wire to prevent deposition at selected areas along the length of a metal wire 12 moving through the deposition chamber 32. The distance between cover placement 36 (FIG. 4b) along the length of metal wire substrate can vary depending upon the size of anode wire (FIG. 4c) that is needed for a particular application. This cover can be made of ceramic or metal sheet. Once the deposition is complete and at the exit end of the deposition chamber, the cover 34 can be removed exposing the metal wire underneath. These uncoated areas can be used for electrical connection in an electrochemical cell.

Figures 5A, 5B:
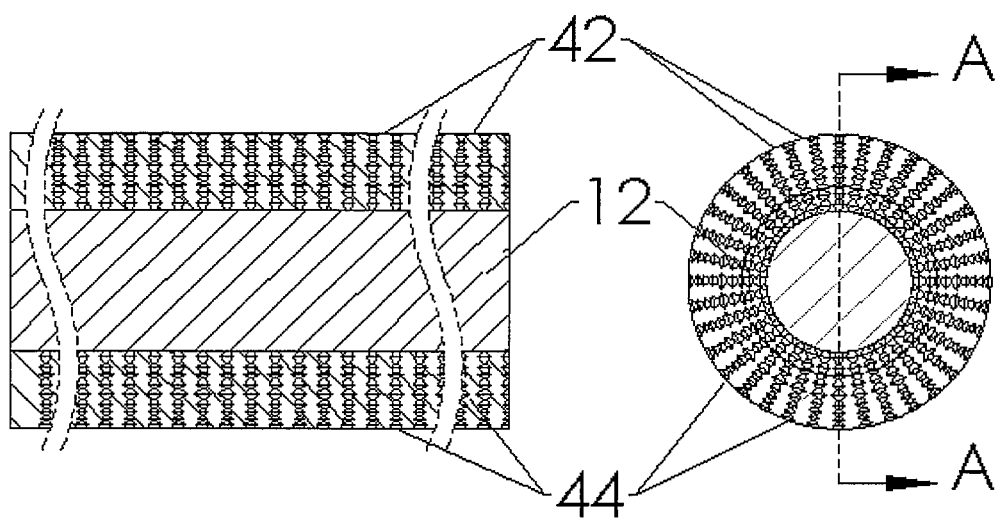
FIG. 5a is a cross sectional side view of an anode component.
FIG. 5b is a partial cross sectional view of the anode component of FIG. 5a taken along the lines A-A.

In one embodiment the moving wire is resistively heated while silicon and/or carbon containing precursor gasses are introduced at locations along with diluting gases such as hydrogen or inert gas. In one example, a hydrogen enriched silicon layer includes 10-80% hydrogen. In another example, an argon enriched carbon layer includes 10-80% argon. Process conditions such as pressure, temperature, flow rates and precursor gases to diluting gases ratio are varied so that hydrogen and/or inert gas is trapped within the growing anode layers. After the formation of the anode layers, the anode coated wire is passed through a vacuum chamber while heated resistively above 1000 degree Celsius. This causes trapped hydrogen and/or inert gas within the anode layers to escape creating diffusion paths and a porous structure. This method can be applied to create porous cathode structure resulting in more rapid charging/discharging of battery. This structure is shown in FIGS. 5a and 5b, with metal wire 12 anode coating 42 and pores 44. The following steps are an example method used to create such structure.

1. Resistively heating of wire and hydrogen etching of native oxide.
2. Deposition of a silicon adhesion layer.
3. Deposition of a highly argon enriched carbon layer by increasing the argon to carbon precursor ratio.
4. Subsequent vacuum annealing of wire and argon enriched carbon layer allowing escape of argon gas from the carbon layer, creating porous pathways within the carbon layer.
5. Deposition of a highly hydrogen enriched silicon layer by increasing the hydrogen to silicon precursor ratio.
6. Subsequent vacuum annealing of the hydrogen enriched silicon layer and wire allowing escape of hydrogen from the silicon layer, creating a porous silicon layer structure.
7. Deposition of a carbon coating as a stress compliant layer as well as reaction barrier between silicon and electrolyte.

Fabrication of Cathode Material

Embodiments of the present invention relate to method of manufacturing a cathode active material on a long circular cross-sectional metal wire substrate. This metal wire substrate performs as current collector in an electrochemical cell. In an embodiment, the cathode material (such as LiCoO2) is deposited on a metal wire employing a method similar to anode formation as described above but with using cathode forming precursors, physical vapor deposition, thermal spray, spray pyrolysis, sol gel and applicable powder metallurgy method using cathode material and/or cathode material precursor with or without binding material. Liquid phase deposition could also be used. This low cost manufacturing method is applicable for layered, spinel, and olivine type structures as well as metal alloy based cathode materials suitable for Li-ion type batteries. In an embodiment, cathode material is deposited on a metal wire substrate resistively heated at temperatures ranging from 100 degree Celsius to 2000 degree Celsius. As the coefficient of thermal expansion of metal wire substrate is higher than the cathode material, strain is introduced within the cathode material and higher level of strain induced crystallization is achieved.

Figure 6:
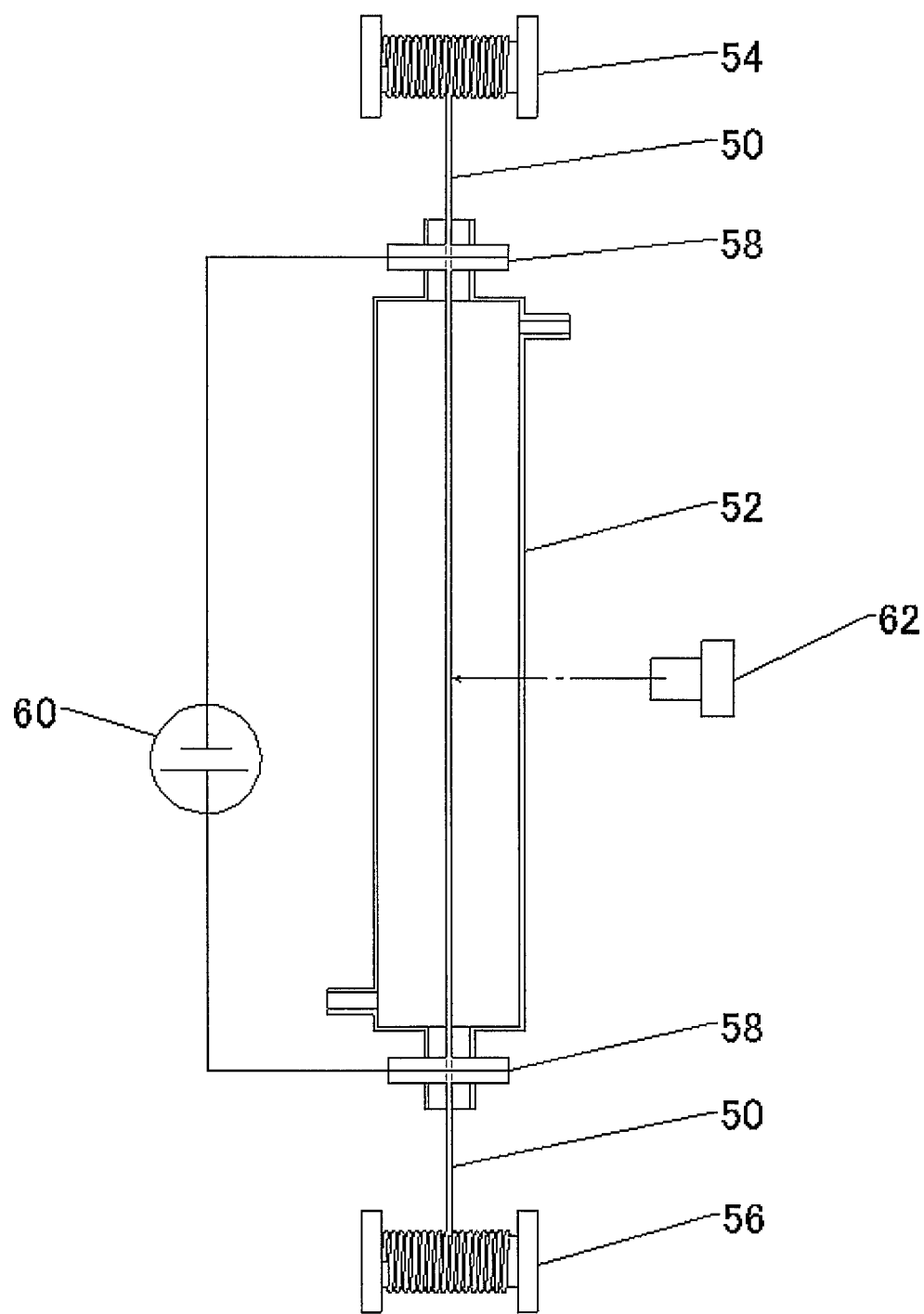
FIG. 6 is a front view of an annealing system for a cathode component.

In an embodiment, an innovative low cost annealing technique to heat treat the deposited cathode material is provided. After deposition of the cathode material on the metal wire substrate, in a sequential step, an electric current is passed through the metal substrate for resistively heating the substrate to desired temperature to induce desired diffusion, crystallization and bonding within deposited cathode material. FIG. 6 is a schematic of a device for a low cost elevated temperature annealing method for deposited cathode. A continuous as-deposited cathode metal wire 50 is passed through an annealing chamber 52 from a wire reel 54 to a receiving reel 56. An electric current is passed through the metal wire by power supply 60 using uncoated area (FIG. 4) at connection points 58 heating the metal wire resistively. Temperature can be monitored using sensor 62 and controlled by feedback to the power supply 60. Set-point electrical current can also be applied thru the deposited material. The temperature of the coated metal wire can be controlled by varying the input current for resistance heating and ranges from 200 C to 2000 C. Various environments such as oxygen or nitrogen or fluorine can be introduced during the annealing process.

Figure 7B:
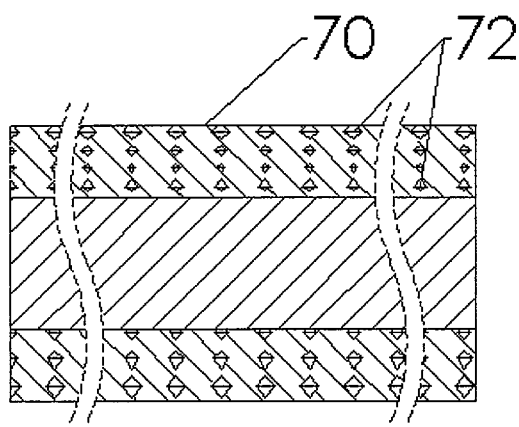
FIG. 7b is a partial cross sectional view of the cathode component of FIG. 7a taken along the lines A-A.
Figure 7A:
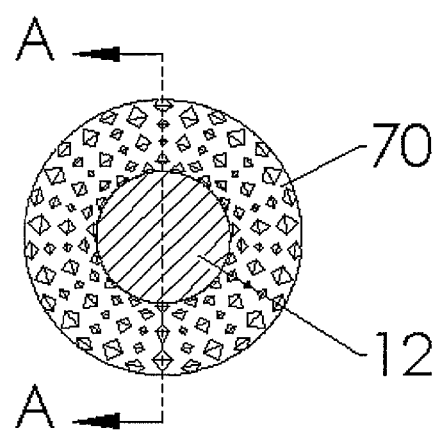
FIG. 7a is a cross sectional side view of a non porous cathode component.

FIGS. 7a and 7b are cross-sectional longitudinal and side views of annealed cathode material 70 on a wire substrate 12. The degree of crystallization is controlled by varying the temperature and time with an increase in temperature and/or time resulting in an increase in crystal size.

Figure 7D:
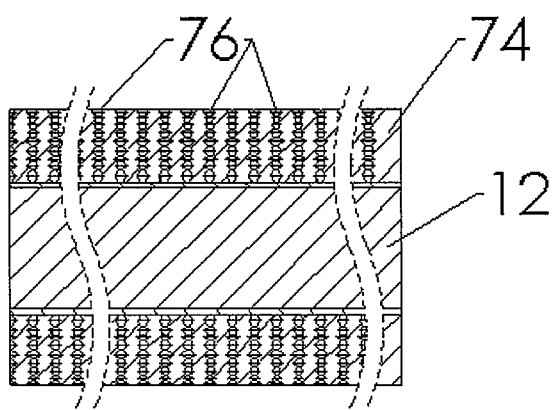
FIG. 7d is a partial cross sectional view of the cathode component of FIG. 7c taken along the lines B-B.
Figure 7C:
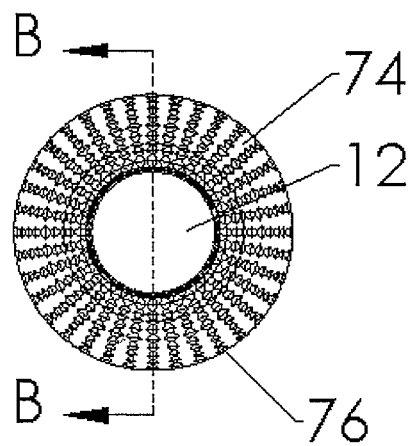
FIG. 7c is a cross sectional side view of a porous cathode component.

In one embodiment, prior to cathode deposition, wire is resistively heated while silicon and/or carbon containing gasses are introduced in the chemical vapor deposition reactor 200 (FIG. 2) along with hydrogen or inert gas such as argon for anode formation as described above. Process conditions are varied so that hydrogen and/or inert gas get trapped within the growing porosity forming coating. This is followed by deposition of cathode material as per the teachings described above. During cathode annealing, trapped gases within the carbon or silicon layer escape creating a porous cathode structure. FIGS. 7c and 7d depict annealed cathode 74 with porous structures 76 and a thin base carbon layer 80 deposited on wire substrate 12. In one example, the carbon layer is thinner than 5 micrometers and is deposited as described above for anode formation in FIG. 5 before deposition of cathode material. Further understanding of the nature and advantages of the present invention may be realized by reference to the latter portions of the specification and attached drawings.

Fabrication of Solid State Battery

According to the teachings described in this disclosure for the fabrication of anode and cathode, a solid state battery can be manufactured where an electrochemical cell structure will be created on an integral high surface area metal wire substrate with circular cross section. An advantage of embodiments of this invention are that, for example, they result in a battery structure that combines excellent performance characteristics of a solid state battery (excellent cycle and calendar life, high Depth of Discharge, rapid charging rate) with the high energy capacity of a traditional battery fabricated using powder based active materials.

This low cost continuous manufacturing technology may be used to create a three dimensional array of high capacity, porous film based "battery-on-wire" structures. Individual "batteries-on-wire" of different diameters are bundled to improve packing density and connected in series or parallel, as required by the application, to form a high capacity battery.

The bundled "battery-on-wire" can be as long as required by application changing the length of individual wire.

The "battery-on-wire" technology has the potential to create a LIB with extremely high charge-discharge rate with sufficient energy density and cycle life. Embodiments of this invention may accomplish high charge-discharge rate by reducing the path length over which the electrons and Li ions move by the use of a multilayer porous film structure coupled with large surface area and increased anode capacity based on silicon. Embodiments of this invention may achieve high specific energy density of the "battery-on-wire" structure by combining wire geometry with a high capacity three dimensional porous silicon containing anode and a less than 2 micron thick electrolyte layer, resulting in a significant improvement in both volumetric and gravimetric capacities.

Figures 8A, 8B:
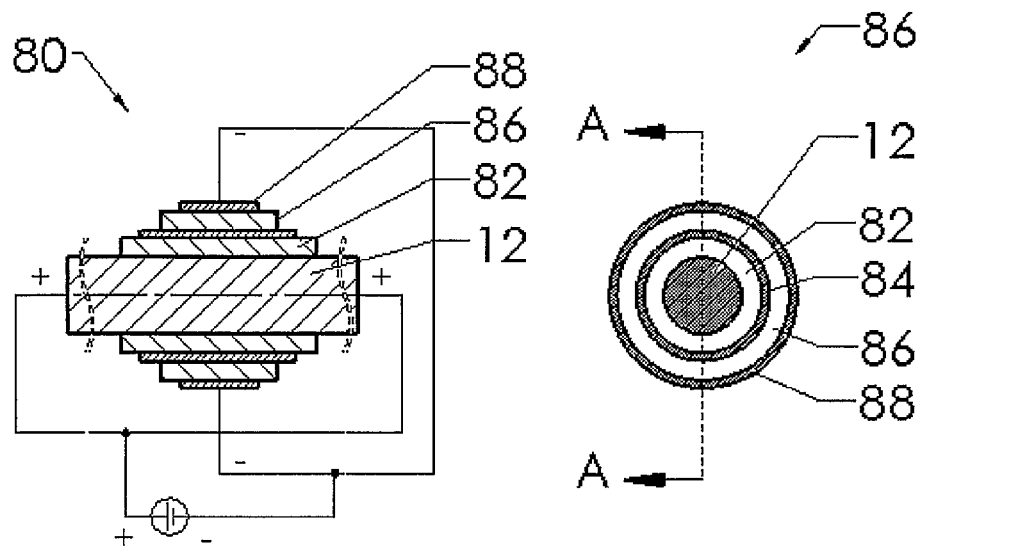
FIG. 8a is a cross sectional side view of a battery featuring an anode layer formed on a wire substrate.
FIG. 8b is a cross sectional front view of the battery of FIG. 8a taken along the lines A-A and a block diagram of circuitry.

Referring to FIG. 8a, in one embodiment of the present invention a method of manufacture of a solid state Li-ion battery (80) comprises the following steps: (1) depositing an active anode material 82 on a metal wire 12 as described in above teaching, (2) depositing a lithium phosphorous oxy nitride (LIPON) or other suitable electrolyte 84 using standard deposition techniques or as described in above teaching for anode fabrication using appropriate electrolyte precursors (3) depositing an active cathode material 86 as described in above teaching, 4) elevated thermal annealing of deposited cathode material to induce desired level of crystallization in selected environments as described above, and 5) metal current collector electrode 88 deposition using precursors of conductive metals such as Al, Cu, or W by an established method such as plasma spray or physical vapor deposition or sputtering.

Figures 8C, 8D:
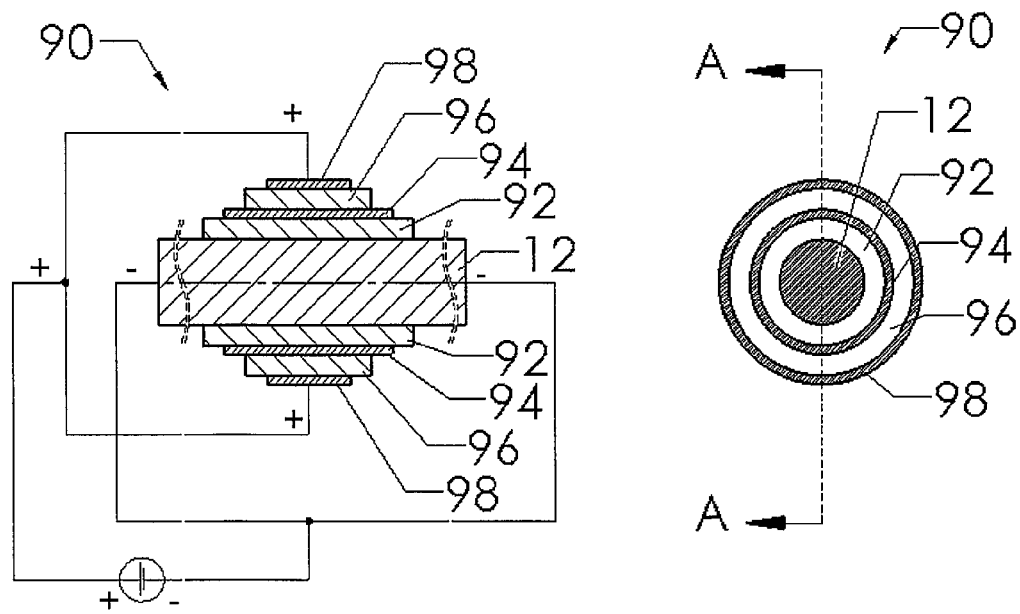
FIG. 8c is a cross sectional side view of a battery featuring a cathode layer formed on a wire substrate.
FIG. 8d is a cross sectional front view of the battery of FIG. 8c taken along the lines A-A and a block diagram of circuitry.

In another embodiment as referred in FIG. 8c, solid state LIBs 90 are manufactured by: 1) depositing an active cathode material 92 on a metal wire 12 as described in above teaching, (2) a elevated thermal annealing of deposited cathode material 12 to induce desired level of crystallization in selected environments as described above, (3) depositing a lithium salt such as lithium phosphorous oxy nitride (LIPON) or other suitable electrolyte 94 using standard deposition technique or as described in the above teaching for anode fabrication using appropriate electrolyte precursors, (4) depositing an active anode material 96 as described in above teachings and (5) metal current collector 98 deposition using precursor of conductive metals such as Al, Cu, or W by an established deposition method such as plasma spray or physical vapor or sputtering. A power source is indicated by the letter P.

Figure 8E:
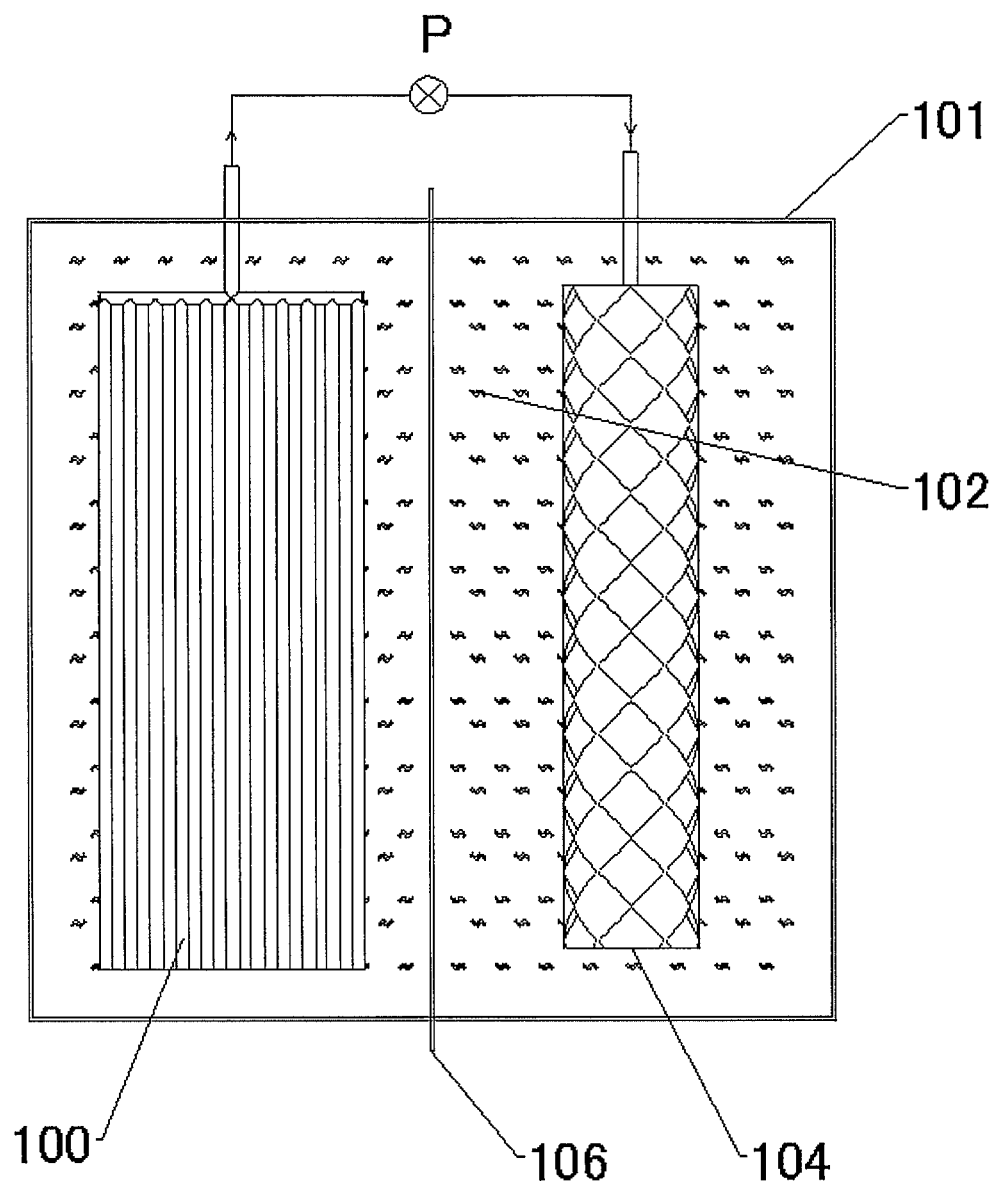
FIG. 8e is a front view of a battery featuring anode components and a foil based cathode.

In one embodiment as referred in FIG. 8e, an LIB 101 is shown comprised of: an anode on metal wire 100 fabricated with the teachings describe above with liquid electrolyte 102 such as LiPF6 and traditional foil based cathode 104 such as LiCoO2 on copper foil with a separator 106. Anode on metal wire can be of various geometrical forms such as woven, cross-weave, hollow spiral, multiple stacks etc. The anode on wire configuration provides tremendous geometric and functional capability to the manufacturing technique.

Figure 8F:
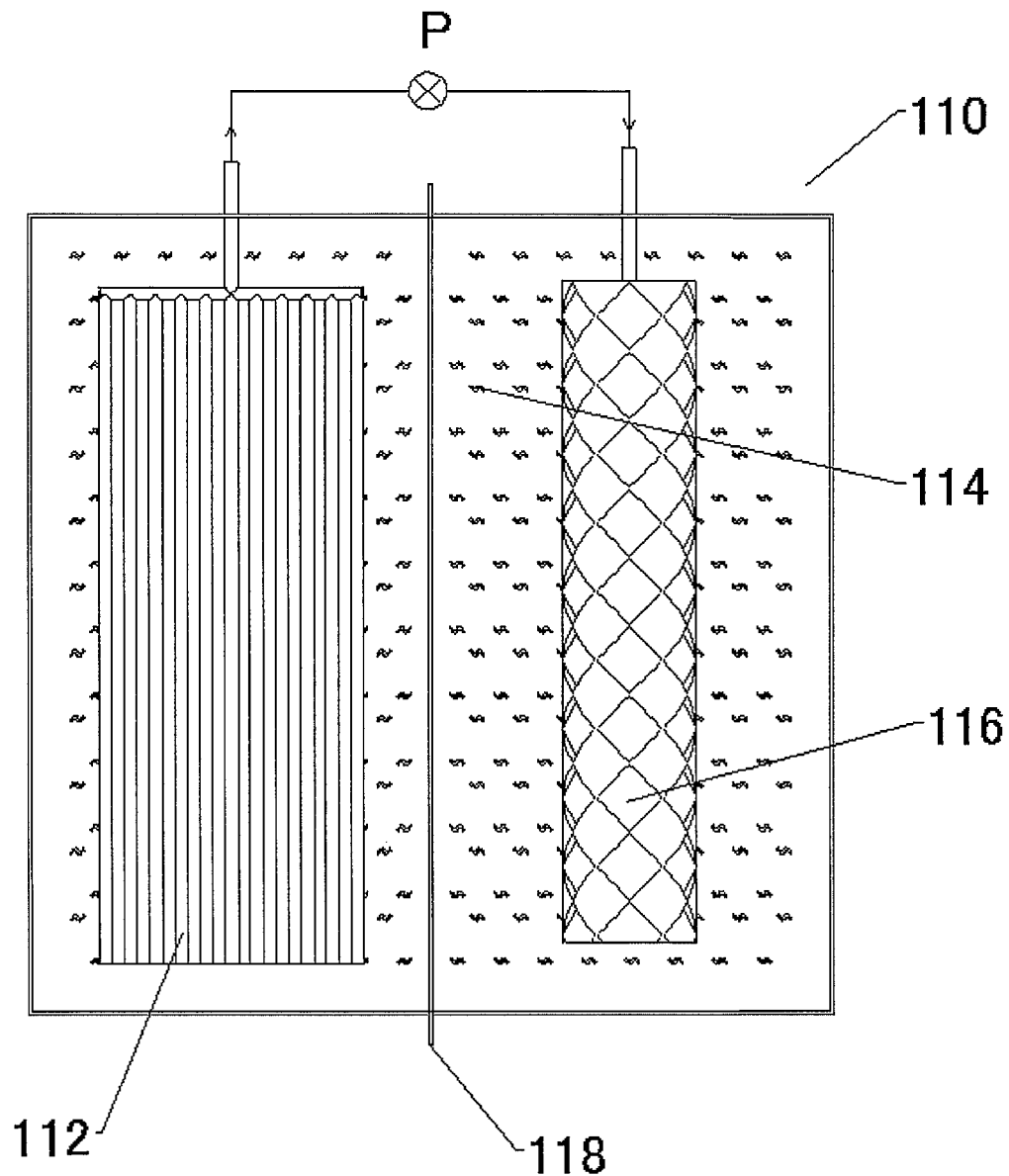
FIG. 8f is a front view of a battery featuring cathode components and a foil based anode.

In another battery (110) embodiment as referred in FIG. 8f, cathode on metal wire 112 fabricated with the teachings describe above is used with liquid electrolyte 114 such as LiPF6 and traditional foil based anode 116 such as graphite on aluminum foil with a separator 118. Cathode on metal wire 112 can be of various geometrical forms such as woven, cross-weave, hollow spiral, multiple stacks etc. The cathode on wire configuration provides tremendous geometric and functional capability to the manufacturing technique.

In another embodiment, both anode and cathode on separate metal wires fabricated with the teachings describe above can be used with a liquid electrolyte such as LiPF6 or polymeric electrolyte along with a separator to fabricate a lithium ion battery. Both anode and cathode on metal wire can be of various geometrical forms such as woven, cross-weave, hollow spiral, multiple stacks etc. The active component formation on wire configuration provides tremendous geometric and functional capability to the manufacturing technique. Also, magnetic field induced due to flow of current through the metal wire substrate can be harvested by arranging metal wire battery parallel, series or cross weave pattern to enhance internal potential of electrochemical cell.

Exemplary configurations described herein are for illustration purposes only and they do not intend to limit the full scope of the possible configurations and combinations that can be achieved following the principles of the present disclosure. The principles of these teachings can be applied for individual components such as the electrodes, or electrolytes or any combination thereof.

Fail-Safe and Damage Tolerant Battery Design

Embodiments of this invention facilitates implementation of control circuitry for charging and safety at both the single as well as the multiple bundle level allowing fabrication of a damage tolerant and inherently safe battery structure. Existing foil-based cells require external protection circuitry to prevent thermal runaway and/or cell rupture in the event of anode-cathode shorting. These external protection circuits reduce the volumetric efficiency of a given cell and often require parasitic current draw from the cell which is being protected. The proposed "battery-on-wire" cell structure can act as an integrated protection circuit, based on the principle of a thermal switch. The current carrying capacity of the "battery-on-wire" will be designed by selecting appropriate wire diameter such that the wire will melt at predesigned location and open the circuit in the event of anode-cathode shorting, effectively making each individual "battery-on-wire" in the bundle a thermal switch. As compared to existing foil-based cells, the "battery-on-wire" structure is expected to provide superior safety, improved volumetric efficiency and require no parasitic current draw for maintenance of an external protection circuit.

Figure 9A:
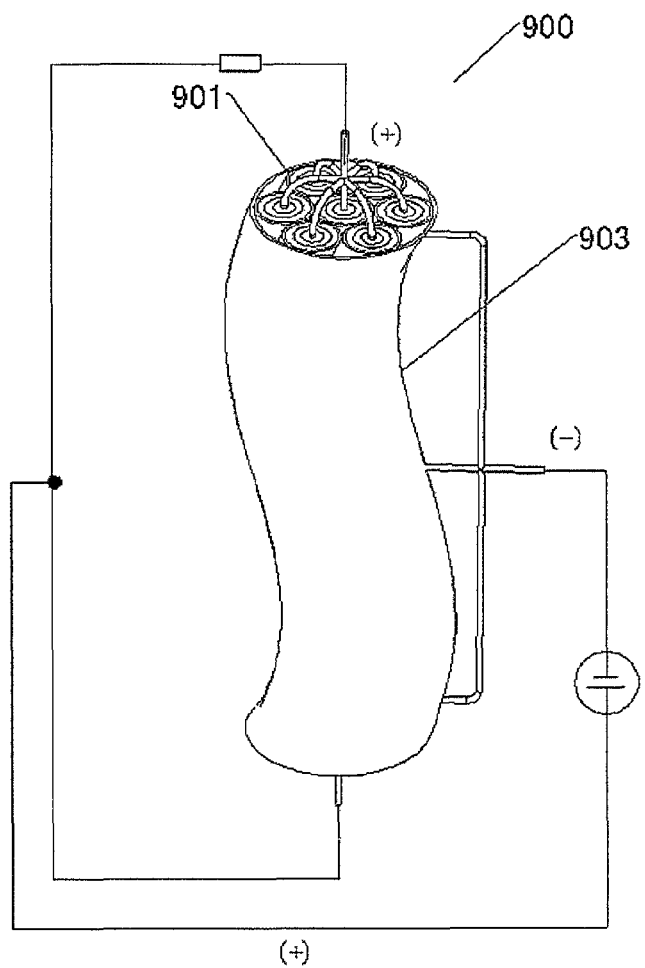
FIG. 9a is a perspective view of a battery assembly of a battery bundle and a block diagram of circuitry.
Figure 9B:
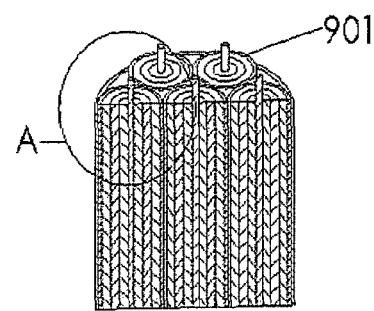
Figure 9C:
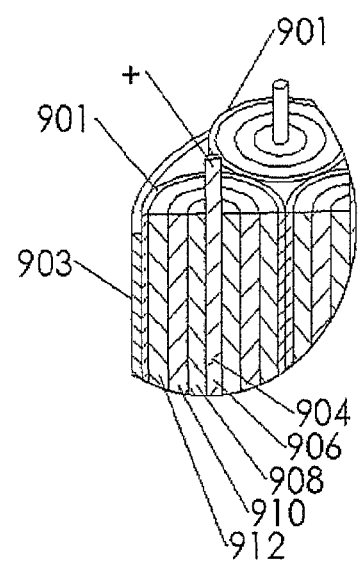
FIG. 9c is a magnified view of portion A of FIG. 9b.

In one embodiment as referred in FIGS. 9a-9e, arrays or bundles 900 of multiple low energy density wire batteries 901 with different diameter to improve packing density are bundled together to form a high density battery 902 suitable for electronics, vehicle, medical, defense and energy storage applications. Referring to FIGS. 9a-9c, each battery 901 of the bundle 900 includes a conductive metal wire substrate 904, an anode material layer 906 deposited on the metal wire substrate spaced apart from a cathode material layer 910, an electrolyte 908 disposed in the space between the anode material layer and the cathode layer and a top current collector 912. The diameter of the metal wire 904 within the bundle 900 ranges from 2-500 micron and is selected appropriately to improve packing density within the bundle. FIG. 9a depicts a single bundle 900 of an array of batteries-on-wires connected in parallel. The bundle includes a polymer casing 903. Depending upon the application requirements diameter and length of individual wire as well as number of the wire in a bundle can be changed.

Figure 9D:
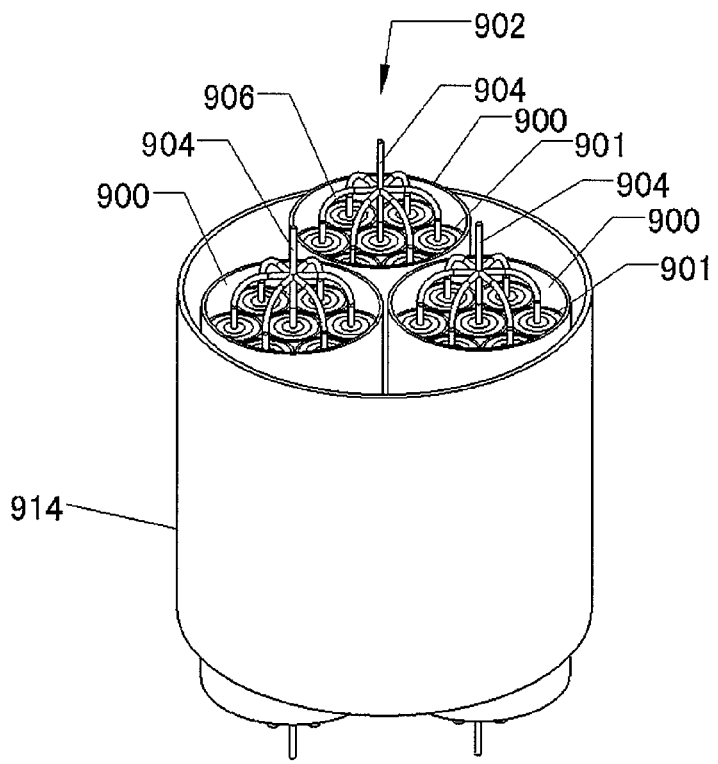
FIG. 9d is a perspective view and partial cutaway view of an energy storage device.
Figure 9E:
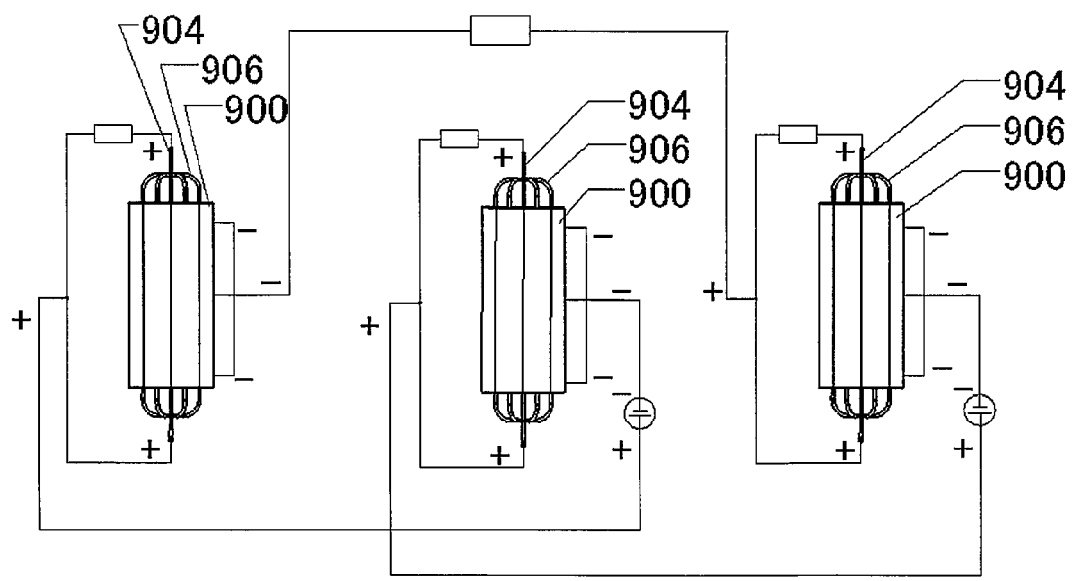
FIG. 9e is a block diagram of circuitry of the energy storage device of FIG. 9d.

Referring to FIGS. 9d and 9e, the high density battery 902 may be packaged in a polymer sheath 914. Anode terminal 904, anode connection wires 906 and cathode connection is shown to form the monolithic battery 902. Single wire batteries 901 can be connected in parallel as required by the application. These bundled wire batteries can be as long as required limited by the length of an individual wire battery.

In bundle 900, outermost or top current collectors 912 (FIG. 9e) for each energy wire 901 are touching each other and electrons are harvested at multiple locations along the length of energy wires. Top current collectors 912 are made of conductive metal including for example steel, tungsten, or coated metals, or ceramic wire. Hundreds of single battery wires can be connected in parallel to form one battery bundle 900. Depending upon the current requirements, the number and length of wire can be increased as required by application while appropriate single battery wire diameter can be selected to improve packing density of single bundle. For example, an individual battery 901 may have a diameter greater than 50 micrometers and may be up to 10 miles long. Further, several bundles 900 can be connected in series to generate the required application voltage. Several bundles depicted in FIG. 9e are connected in series to make a higher capacity battery. Depending upon the application requirements the number of bundles in a battery can be increased.

This concept facilitates implementation of control circuitry for charging and safety at both, the single as well as the multiple bundle level. Isolation of the metal cores from the bundled ends is required in the end region of each group to prevent local shorting of the anode and cathode for a robust battery. This is achieved by placing a cover or spacer over the metal wire before wire enters the deposition chamber as described in FIGS. 4a and 4b. Exemplary configurations described herein are for illustration purposes only and they do not intend to limit the full scope of the possible configurations and combinations that can be achieved following the principles of the present disclosure.

Figure 10:
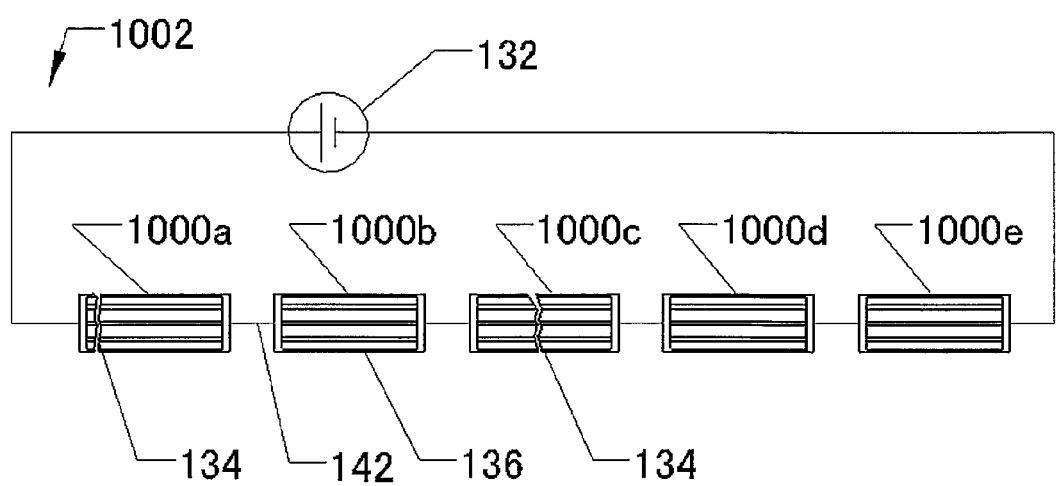
FIG. 10 is a block circuitry diagram for battery bundles.

According to the teaching set forth in this disclosure and referred to in FIG. 10, damage tolerant battery design embodiments are described. As required by the application, bundles 1000a-e of single energy wire are connected in series by series connection 142 to form a high energy density battery 1002 connected, for example, to a power source 132. As depicted in FIG. 10, fabrication of a high energy density battery, as described, including multiple low energy wire battery allows damage 134 to the battery 1002 where only the damaged wire batteries 1000a and 1000c become non-functional while other bundle wire battery 1000b, 1000d, and 1000e perform although with lower energy output. The application of this invention prevents release of large amount of energy due to shorting between anode and cathode within energy wire bundle. Anode-cathode shorting due to damage releases low energy only from the damage single wire battery bundle as compared to foil based design where large amounts of energy can be released.

Figure 11A:
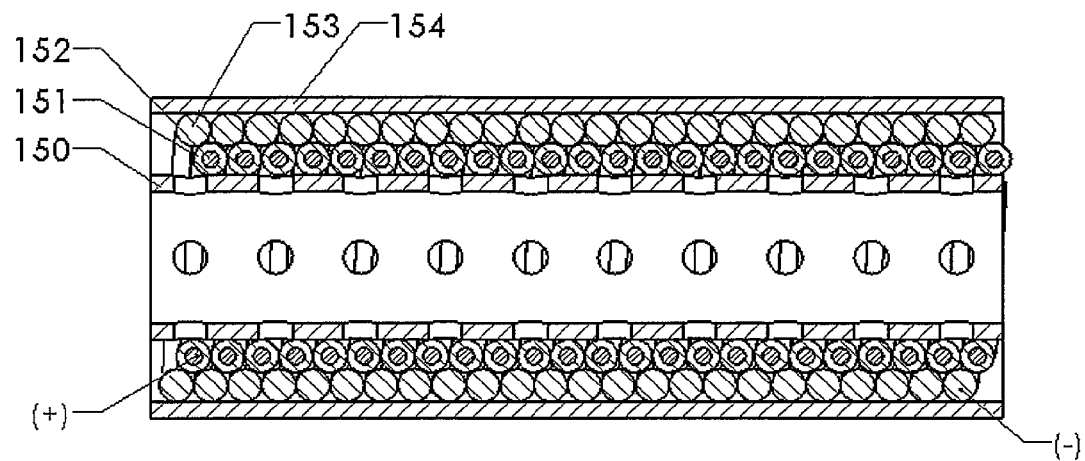
FIG. 11a is a cross sectional view of a battery formed with a mandrel.
Figure 11B:
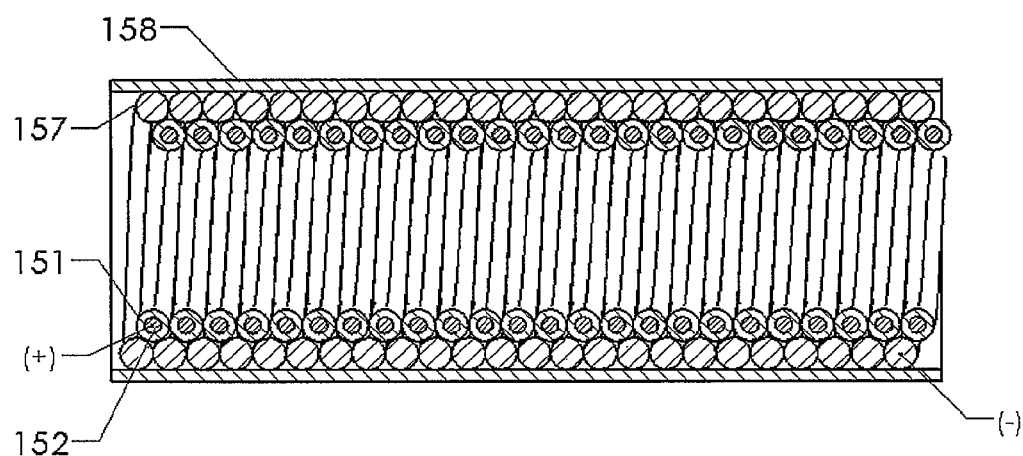
FIG. 11b is a cross sectional view of the battery of FIG. 11a without the mandrel.

Embodiments of the present invention also offer a high degree of flexibility as compared with conventional approaches and offer significant advantages as presented in electrochemical cell in FIGS. 11a and 11b. For example, anode and cathode wire can be used to create a spiral structure. According to the teaching set forth in this disclosure and referred to in FIG. 11a, an anode wire 151 with integrated separator 152 is wrapped around a mandrel tube 150 with holes. This is followed by wrapping a cathode wire 153 and casing material 154. Anode wire 151 and cathode wire 153 are used as current collector. Both the anode and cathode may be made from, for example, conductive metal, coated metal, metal coated oxide, or carbon wire. Mandrel tube 150 is filled with standard electrolyte such as LiPF6 to make a spiral wire battery. These spiral wire batteries can be as long as required limited by the length of mandrel tube 150. Several other modification of such approach is envisioned. In another embodiment as described in FIG. 11b, hollow mandrel tube 150 is removed after filling with liquid electrolyte 157 with casing material 158 providing containment. Such spiral structure can also be created using solid state battery wire (FIG. 8) with and without mandrel tube 150 using the method described above. Exemplary configurations described herein are for illustration purposes only and they do not intend to limit the full scope of the possible configurations and combinations that can be achieved following the principles of the present disclosure.

What is claimed is:

1. A battery comprising:
   a conductive metal wire with a diameter in the range of 5-500 micrometers having a circular cross section;
   a first layer disposed on the metal wire;
   a second layer formed on the first layer, wherein one of the first and second layers is carbon and the other is silicon, the metal wire and the first and second layers forming a first electrode;
   a cylindrical second electrode spaced apart from the first electrode; and
   an electrolyte occupying the space between the first and second electrodes;
   wherein the first and second layers have pores formed therein and the pores provide an enlarged area for ion exchange between the first and second electrodes.

2. The battery of claim 1 wherein when the carbon layer is the first layer and the silicon layer is the second layer, further including a second carbon layer disposed on the silicon layer.

3. The battery of claim 2 further comprising another silicon layer disposed on the second carbon layer.

4. A battery comprising:
   a conductive metal wire with a diameter in the range of 5-500 micrometers having a circular cross section;
   a first layer disposed on the metal wire;
   a second layer formed on the first layer, wherein one of the first and second layers is carbon and the other is silicon, the metal wire and the first and second layers forming a first electrode;
   a cylindrical second electrode spaced apart from the first electrode; and
   an electrolyte occupying the space between the first and second electrodes;
   wherein the first layer is an inert gas or hydrogen enriched silicon or carbon layer.

5. A battery, comprising:
   a first electrode including an anode wire having a circular cross section and surrounded by a separator;
   a removable mandrel tube including a surface defining a hollow chamber, the first electrode wire wrapped around the removable mandrel tube;
   a second electrode including a cathode wire having a circular cross section, the second electrode wrapped around the first electrode;
   a casing material encasing the first and second electrodes and the removable mandrel tube; and
   an electrolyte disposed in the hollow chamber.

* * * * *